United States Patent
Hicks et al.

(10) Patent No.: US 11,709,936 B2
(45) Date of Patent: Jul. 25, 2023

(54) AUTOMATIC INTEGRITY VULNERABILITY DETECTION IN AN INTEGRATED DEVELOPMENT ENVIRONMENT

(71) Applicant: International Business Machines Corporation, Armonk, NY (US)

(72) Inventors: Andrew C. M. Hicks, Wappingers Falls, NY (US); Diane Marie Stamboni, Poughkeepsie, NY (US); Thomas William Conti, Poughkeepsie, NY (US); Gregg Arquero, White Plains, NY (US); Joshua David Steen, Fishkill, NY (US); Michael Page Kasper, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 16/923,169

(22) Filed: Jul. 8, 2020

(65) Prior Publication Data

US 2022/0012335 A1   Jan. 13, 2022

(51) Int. Cl.
G06F 21/56 (2013.01)
G06F 8/73 (2018.01)
G06F 21/55 (2013.01)
G06F 21/54 (2013.01)

(52) U.S. Cl.
CPC .............. *G06F 21/563* (2013.01); *G06F 8/73* (2013.01); *G06F 21/54* (2013.01); *G06F 21/554* (2013.01)

(58) Field of Classification Search
CPC .......... G06F 21/563; G06F 8/73; G06F 21/54; G06F 21/544
See application file for complete search history.

(56) References Cited

U.S. PATENT DOCUMENTS

| | | |
|---|---|---|
| 7,877,812 B2 | 1/2011 | Koved et al. |
| 8,776,239 B2 | 7/2014 | De Keukelaere et al. |
| 9,262,597 B2 * | 2/2016 | Neerumalla ............ G06F 21/53 |
| 9,851,966 B1 | 12/2017 | Barday |
| 9,965,633 B2 | 5/2018 | Brucker et al. |
| 2011/0179400 A1 * | 7/2011 | Scholz ................ G06F 11/3612 |
| | | 717/124 |

* cited by examiner

*Primary Examiner* — Paul E Callahan
(74) *Attorney, Agent, or Firm* — Cantor Colburn LLP; Teddi Maranzano

(57) ABSTRACT

Aspects of the invention include receiving, by a processor, source code for a software program written in a first programming language. The received source code is converted into abstracted source code that is in a generic format that is different than a format of the first programming language. The abstracted source code is compared to known source code patterns. Based on determining that at least a subset of the abstracted source code matches a pattern in the known source code patterns, sending an alert to the user indicating that the received source code matches the pattern.

17 Claims, 5 Drawing Sheets

US 11,709,936 B2

AUTOMATIC INTEGRITY VULNERABILITY DETECTION IN AN INTEGRATED DEVELOPMENT ENVIRONMENT

BACKGROUND

The present invention generally relates to generating computer software, and more specifically, to automatic integrity vulnerability detection in an integrated development environment (IDE).

An IDE is a software application (or a group of software applications) that provides comprehensive facilities to computer programmers for software development. An IDE typically includes a source code editor, build automation tools, and a debugger. Some IDEs also include a compiler and/or interpreter. IDEs are designed to maximize programmer productivity by providing tight-knit components with similar user interfaces.

SUMMARY

Embodiments of the present invention are directed to automatic error detection in an integrated development environment (IDE). A non-limiting example computer-implemented method includes receiving, by a processor, source code for a software program written in a first programming language. The received source code is converted into abstracted source code that is in a generic format that is different than a format of the first programming language. The abstracted source code is compared to known source code patterns. Based on determining that at least a subset of the abstracted source code matches a pattern in the known source code patterns, sending an alert to the user indicating that the received source code matches the pattern.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
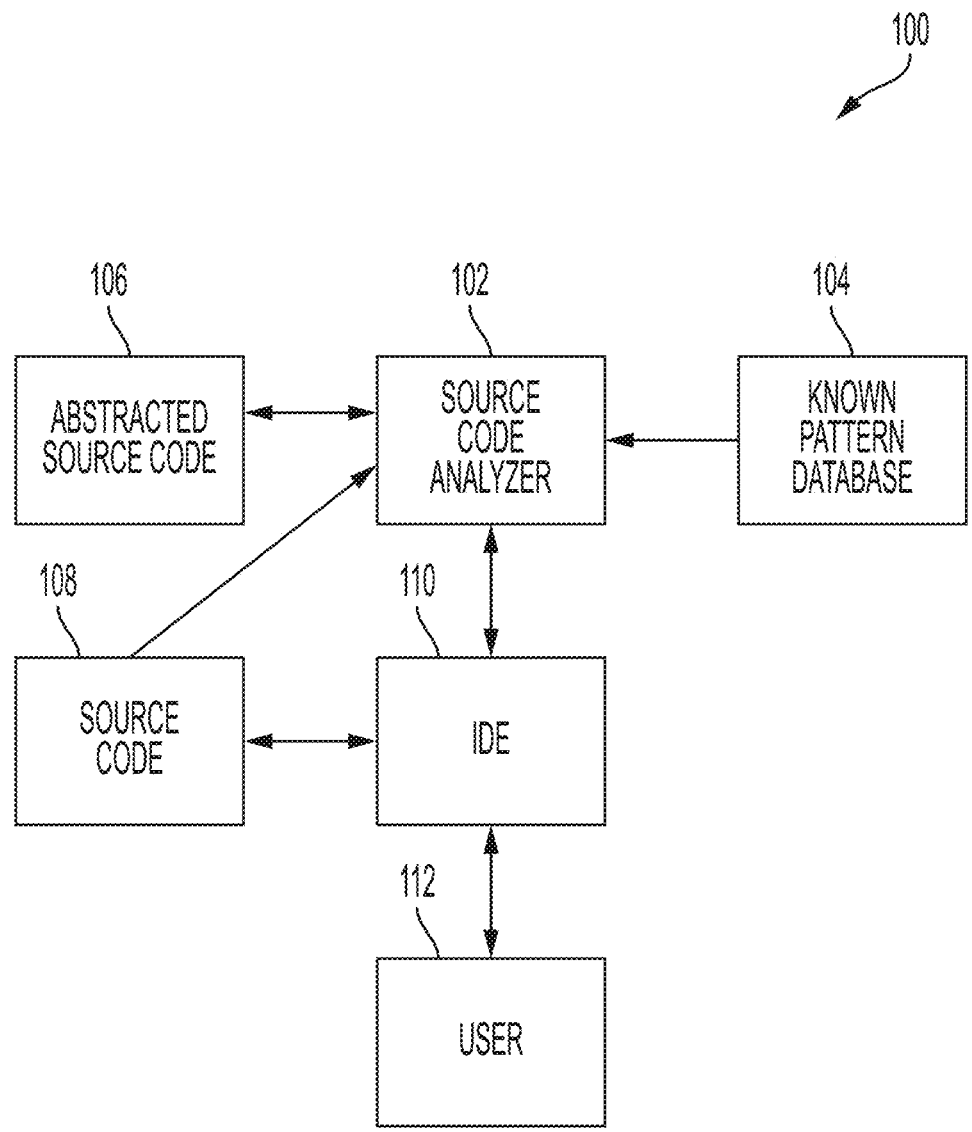
FIG. 1 depicts a block diagram of a system for automatic integrity vulnerability detection in an integrated development environment (IDE) according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide automatic integrity vulnerability detection in an integrated development environment (IDE). In accordance with one or more embodiments of the present invention, integrity vulnerability patterns are detected automatically while a user is writing source code using a source code editor in an IDE. Upon receiving the source code, one or more embodiments of the present invention automatically scan and parse the source code, and potential vulnerabilities are identified by matching the source code against known integrity vulnerability patterns. The user is then alerted of the identified potential vulnerabilities via the source code editor. In addition, a proposed solution may be presented to the user.

It is common for existing source code to be copied and used as a starting point for new source code. This can result in potential integrity vulnerabilities in existing source code being propagated to new source code. One or more embodiments of the present invention may be utilized to prevent the propagation of potential integrity vulnerabilities by analyzing existing source code located, for example, in a source code repository. When the analysis is performed in an interactive, online manner, the user can be alerted of the identified potential vulnerabilities (and optionally presented with a proposed solution) via a user interface. When the analysis is performed in a background, or batch manner, a report can be generated and sent to a specified user.

As used herein, the term "integrity vulnerability pattern" refers to a description of contents of source code that has the potential of reading from or writing to an unintended location. Examples of types of potential vulnerability patterns include, but are not limited to: over reading, or reading past an intended area; over writing, or writing past an intended area; and index out of bounds or accessing an index value beyond the size of the index. Integrity vulnerability patterns located in source code can be caused for example, by human errors such as programming errors. In other cases, source code having a vulnerability pattern may be inserted purposefully and result in the execution of malicious code which reads or writes data at locations that it should not be accessing.

In accordance with one or more embodiments of the present invention, known integrity vulnerability patterns are stored in a generic format that is not programming language specific, such as JavaScript Object Notation (JSON) or extensible markup language (XML). As known in the art, JSON is a standard text-based format for representing structure data, and it is commonly used for transmitting data in web applications. JSON objects are written in key/value pairs where the keys are strings and the values are a data type such as, but not limited to: string, number, object, array, Boolean or null.

In accordance with one or more embodiments of the present invention, the source code that is being analyzed is parsed and converted into abstracted source code. The abstracted source code can be in a generic format that is the same format used to store the known integrity vulnerability patterns. The abstracted source code is compared to the known patterns to identify any potential integrity vulnerabilities in the source code.

One or more embodiments of the present invention can be integrated within an IDE. As described above, an IDE provides comprehensive facilities to computer programmers for software development.

One of more embodiments of the present invention parse and save the code into one or more JSON objects that are sent to a cloud server for analysis to determine if the source code has potential integrity vulnerabilities. In other embodiments, the analysis is run locally on the user machine. During the analysis, one or more embodiments of the present invention compare the JSON objects of the abstracted source code against vulnerability patterns also contained within JSON objects. In accordance with one or more embodiments of the present invention, a degree of confidence that contents of the abstracted source code match a known pattern can be calculated. If the degree of confidence is greater than a given threshold (e.g., 30%, 50%, 75%), then lines of code in the source code corresponding to the contents of the abstracted source code can be flagged for investigation. The threshold can be dynamically adjusted based, for example, on component complexity and heuristics around the types of vulnerability found.

Upon the identification of a known pattern, one or more embodiments of the present invention generate a notification in-line to the user describing the potential problem along with a proposed solution to fix the problem. The user can either accept or reject the proposed solution. Upon user acceptance of the solution, the system then replaces the existing code with the new code. In accordance with one or more embodiments of the present invention, when false-positives are identified, the database of known patterns can be updated.

Embodiments of the present invention are compatible with modern compliers or interpreters such as, but not limited to: C/C++, Java, CGI/Perl, or Python. In addition, JSON objects can be stored for all known potential integrity vulnerability patterns along with a proposed solution for each pattern in the languages supported by the available compilers.

One or more embodiments of the present invention provide technological improvements over current methods of identifying potential integrity vulnerabilities in computer software. A disadvantage of contemporary approaches is that it is a manual process that requires a programmer and/or tester to generate tests cases that test for potential integrity vulnerabilities such as, but not limited to, over reading and over writing. Contemporary approaches can be expensive in terms labor cost as well as error prone due for example, to human errors in determining test scenarios that test for potential integrity vulnerabilities. Contemporary approaches can also be expensive in terms of having to analyze, update and retest the source code. One or more embodiments of the present invention provide technical solutions to one or more of these disadvantages by providing automated pattern matching to known integrity vulnerability patterns. As more vulnerability patterns are discovered they can be added to the known integrity vulnerability patterns. Automating the matching and building of the database of known patterns can eliminate the human error in selecting testing test cases to test for integrity vulnerabilities. In addition, by analyzing the source code while it is being written (and without requiring the source code to be compiled or executed) one or more embodiments of the present invention allow for early detection of possible integrity vulnerabilities. Identifying possible issues early in the development process can save costs by eliminating the need to test the source code multiple times.

Another disadvantage of contemporary approaches is that errors in existing source code are often propagated into new source code due to programmers using existing source code as a starting point for new source code. One or more embodiments of the present invention provide technical solutions to this disadvantage by providing analysis on existing source code to assist in updating existing source code to eliminate potential integrity vulnerabilities.

Turning now to FIG. 1, a block diagram of a system 100 for automatic integrity vulnerability detection in an IDE is generally shown in accordance with one or more embodiments of the present invention. In accordance with one or more embodiments of the present invention all of the components in the system 100 are located on one or more processors in the same data center. In accordance with one or more other embodiments of the present invention, all or a portion of the components of the system 100 are located on different processors in different data centers and/or in a cloud computing environment.

The components of the system 100 shown in FIG. 1 include source code analyzer 102, known pattern database 104, abstracted source code 106, source code 108, IDE 110, and user interface 112. The known pattern database 104, abstracted source code 106, and source code 108 can be stored in any configuration and in any type of storage and/or memory.

As shown in FIG. 1, a user can interact with the IDE 110 via the user interface 112 to perform software development activities. In an embodiment, the user interface 112 is a user interface screen. The IDE 110 may be implemented by any IDE known in the art such as, but not limited to: Eclipse, IBM® Develop for z/OS®, and Microsoft® Visual Studio.

As shown in FIG. 1, the IDE 110 includes (or interacts with) source code analyzer 102 which performs at least a subset of the functions described herein. In accordance with one or more embodiments of the present invention, the source code analyzer 102 is a static analysis tool. As known in art, a static analysis tool is a tool that analyzes source code without the need to run, or execute, the source code. The source code analyzer 102 can be a stand-alone tool provided as part of the IDE 110, or it can be integrated with a linter tool or a source code editor provided as part of the IDE 110.

The source code analyzer 102 receives source code 108. An example of the source code 108 written in C/C++ follows:

```
char indata[10];
char tempdata[20];
char outdata[10];
strncpy(tempdata,indata,20);
if (strncmp(tempdata,outdata,20))
    strncpy(outdata,tempdata,20);
```

In accordance with one or more embodiments of the present invention all three lines of executable code shown above will be flagged as potential integrity vulnerabilities because the length used is greater than one of the operands in each case. The first line of executable code shown above results in an over read, the second line in an invalid comparison, and the third line in an over write.

The source code analyzer 102 converts the received source code 108 into abstracted source code 106. The example source code 108 shown above can be converted into the following abstracted source code when the implementation uses JSON objects:

```
{"data":{"variable":{"name":"indata","type":"string","length":"10"}}}
{"data":{"variable":{"name":"tempdata","type":"string","length":"20"}}}
{"data":{"variable":{"name":"outdata","type":"string","length":"10"}}}
{"data":{"variable":{"name":"tempptr","type":"pointer","value":"0"}}}
{"data":{"variable":{"name":"tempvalue","type":"integer","based":"tempptr"}}}
{"code":{"copy":{"source":"indata","target":"tempdata","length":"20"}}}
{"code":{"string compare":{"left":"tempdata","right":"outdata","length":"20"}}}
{"code":{"copy":{"source":"tempdata","target":"outdata","length":"20"}}}
{"code":{"read":{"source":"tempvalue","target":"tempnum"}}}
{"code":{"write":{"source:"tempnum","target"":"tempvalue"}}}
```

In accordance with one or more embodiments of the present invention, the source code analyzer 102 compares the abstracted source code 106 with at least a subset of the contents of a known pattern database 104 of known potential integrity vulnerability patterns. The known pattern database 104 can be updated by a user such as a programmer, based on the identification of additional potential integrity vulnerability patterns. In addition, patterns can be modified or removed from the known pattern database 104 based on a pattern generating a number of false positives or other criteria.

Examples of contents of the known pattern database 104 follows:

```
{"pattern":{"copy":{"source.length","less than","copy.length"}},"confidence":"100"}
{"pattern":{"copy":{"target.length","less than","copy.length"}},"confidence":"100"}
{"pattern":{"compare":{"left.length","less than","compare.length"}},"confidence":"100"}
{"pattern":{"compare":{"right.length","less than","compare.length"}},"confidence":"100"}
{"pattern":{"read":{"pointer","value","null"}},"confidence":"50"}
{"pattern":{"write":{"pointer,"value","null"}},"confidence":"50"}
```

Examples of comparing JSON objects that reflect lines in source code that are compared to known potential vulnerability patterns are shown below. In these examples, the variables "indata", "tempdata", and "outdata" are defined as shown above with "indata" and "outdata" each being 10 characters, and "tempdata" being 20 characters.

Example 1

Abstracted line of code:
{"code":{"copy":{"source":"indata","target":"tempdata", "length":"20"}}}

The source length of "indata" is 10, the length of "tempdata" is 20, and the length of the copy is 20. A match occurs with this abstracted line of source code and the following pattern which describes a scenario where the source length is less than the copy length:
"pattern": {"copy": {"source.length","less than","copy.length"} },"confidence":"100"}

In this example, a match occurs because the source length (10) is less than the copy length (20). The likelihood of the match being a security vulnerability is 100%.

Example 2

Abstracted line of code:
{"code":{"string compare":{"left":"tempdata","right":"outdata","length":"20"}}}

The length of the left value "tempdata" is 20, the length of the right value "outdata" is 10, and the length of the comparison is 20. A match occurs with this abstracted line of source code and the following pattern which describes a scenario where the right value length is less than the compare length:

{"pattern":{"compare":{"right.length","less than","compare.length"}},"confidence":"100"}

In this example, a match occurs because the length of the right value ("outdata") is 10 and the length of the compare is 20. The likelihood of the match being a security vulnerability is 100%.

Example 3

In the following abstracted line of code:
{"code": {"copy": {"source":"tempdata","target":"outdata","length":"20" }}}

The source length of "tempdata" is 20, the length of "outdata" is 10, and the length of the copy is 20. A match occurs with this abstracted line of source code and the following pattern which describes a scenario where the target length is less than the copy length:
{"pattern": {"copy": {"target.length","less than","copy.length"}},"confidence":"100"}

In this example, a match occurs because the length of the target ("outdata") is 10 and the copy length is 20. The likelihood of the match being a security vulnerability is 100%.

Example 4

Abstracted lines of code:

```
{"data":{"variable":{"name":"tempptr","type":"pointer","value":"0"}}}
"code":{"read":{"source":"tempvalue","target":"tempnum"}}}
```

The source "tempvalue" is based on "tempptr and the target is "tempnum."

A match occurs with this abstracted line of source code and the following pattern if the pointer to the source (tempptr) is null.

{"pattern": {"read": {"pointer","value","null"}},"confidence":"50"}

Since it is not known whether the null pointer will expose data or not depending on the run time environment, the abstracted line of code has a 50% chance of indicating a security vulnerability.

In accordance with one or more embodiments of the present invention, the source code analyzer 102 performs the analysis of the source code in real-time or near real time while the user is editing the source code. Source code that matches a pattern in the known pattern database 104 can be highlighted on the user interface 112 of the user along with a proposed solution to correct the problem. In these embodiments, source code 108 includes the source code currently being edited by the user. In embodiments where the analysis is being performed on previously written, or existing code, source code 108 can include a repository of the previously written source codes.

Proposed solutions corresponding to patterns in the known pattern database 104 can be stored for example, in the known pattern database 104. Examples of proposed solutions presented to the user via the user interface 112 can include, but are not limited to: "Potential buffer overflow vulnerability detected: try using strlcpy or increasing the buffer size"; "Potential incorrect char array comparison detected: adjust the lengths of the compared values or substring the larger value"; and "Check the bounds of the buffer before attempting to read."

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional known pattern databases and source codes, etc.) For example, all or a portion of the source code analyzer 102 can be located in the IDE 110. Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
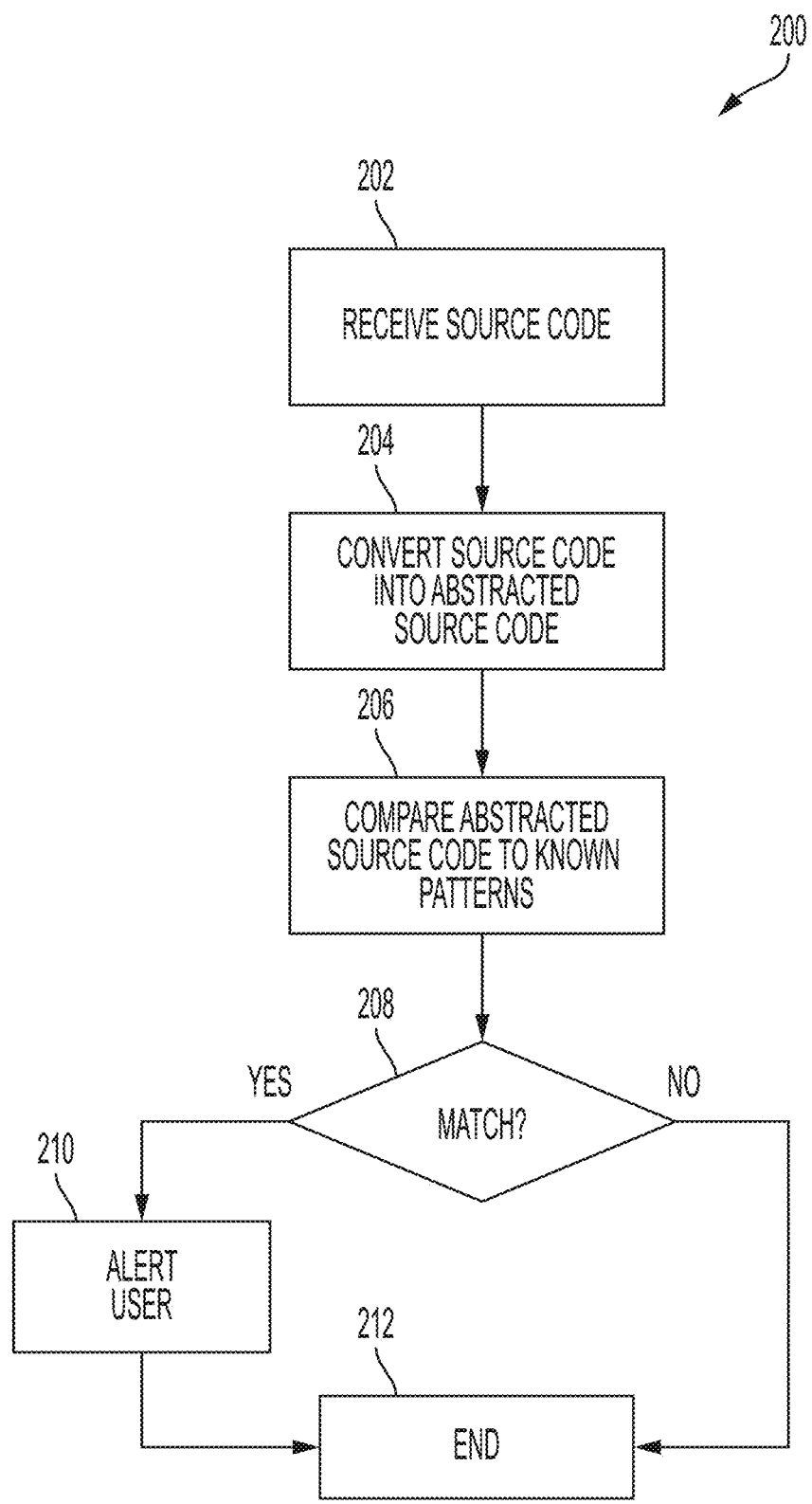
FIG. 2 depicts a process flow diagram of automatic integrity vulnerability detection in an IDE according to one or more embodiments of the present invention.

Turning now to FIG. 2, a process flow of a method 200 for automatic integrity vulnerability detection in an IDE is generally shown in accordance with one or more embodiments of the present invention. All or a portion of the processing shown in FIG. 2 can be implemented by the source code analyzer 102 of FIG. 1. At block 202 source code is received. The source code can include all or a portion of the source code contained in software program or software module. As described previously, the source code can be source code that is currently being edited by a programmer or other user, or it can be previously written source code that is received from a source code repository or other location.

At block 204, the received source code is converted into abstracted source code. The abstracted source code is in a generic format that is different than the format of the received source code. As shown in the example above, the abstracted source code can include JSON objects and the generic format can be a JSON format. JSON is one example of the generic format that can be implemented by one or more embodiments of the present invention. Any other generic format such as, but not limited to, XML can also be utilized. In accordance with one or more embodiments of the present invention, a mapping is maintained between a location in the source code and a location in the abstracted source code.

Referring to block 206 of FIG. 2, the abstracted source code is compared to known patterns (also referred to herein as "known source code patterns") located, for example, in known pattern database 104 of FIG. 1. The abstracted source code can be compared to all or a subset of the patterns based, for example, on the programming language of the source code and a security classification of the software program (e.g., does it access operating system memory, it is being used to perform a security function such as cryptography, etc.). Other criteria can include the environment where the software program will be executing (e.g., particular countries, particular industries, particular locations of user, etc.). The comparing can include determining a degree of match between the abstracted source code and the patterns. The threshold degree of match confidence required to flag the source code as matching and having a possible integrity vulnerability can be varied based on criteria such as, but not limited to, the security classification of the software program and the environment where the software program will be executing.

At block 208 it is determined if a match has occurred between the abstracted source code and a known pattern. A match can occur, for example, if the degree of match confidence meets a threshold degree of match. If, as determined at block 208, a match is not located, processing continues at block 212 with process ending and waiting for additional source code to analyzed.

If a match is determined at block 208, processing continues at block 210 with alerting the user. When the method 200 of FIG. 2 is being performed while a user is updating the source code, the alerting can include highlighting a portion of the received source code that matches the known pattern on a user interface of the IDE. The alerting can also include sending the degree of match confidence to the user interface and/or sending a proposed action to eliminate the match to the user interface. In response to the user indicating that they agree with the proposed action to eliminate the match, one or more embodiments of the present invention can perform the proposed action by modifying the source code.

In accordance with one or more embodiments of the present invention, the alert, or notification, is contained in a JSON payload itself with fields containing the response and degree of confidence. An example follows:

```
{
ConfidenceLevel: "80%"
VulnerbilityPattern: "Potential buffer overflow vulnerability detected"
Solution: "Try using strlcpy or increasing the buffer size"
}
```

Another example follows:

```
{
ConfidenceLevel: "100%"
VulnerbilityPattern: "Buffer overflow vulnerability detected"
Solution: "Increase the size of outdata to 20."
}
```

When the method 200 of FIG. 2 is performed in a background or batch mode, the alerting can include sending a report that includes a portion of the received code that matches the pattern. In addition, the report can also include a degree of match confidence associated with the match and/or a proposed action to eliminate the match. The report can be stored in a storage medium or sent to a user(s) via any transmission medium such as via email or via text message.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
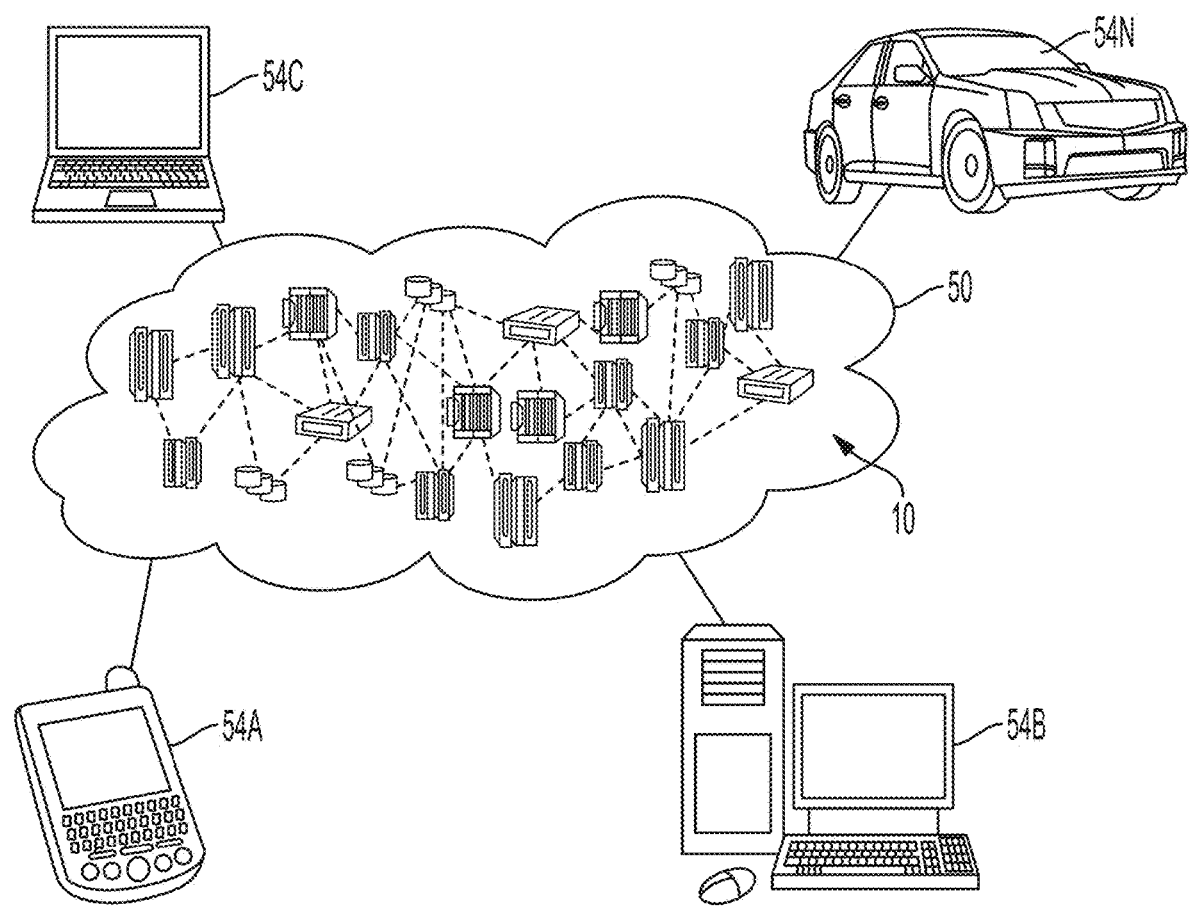
FIG. 3 depicts a cloud computing environment according to one or more embodiments of the present invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
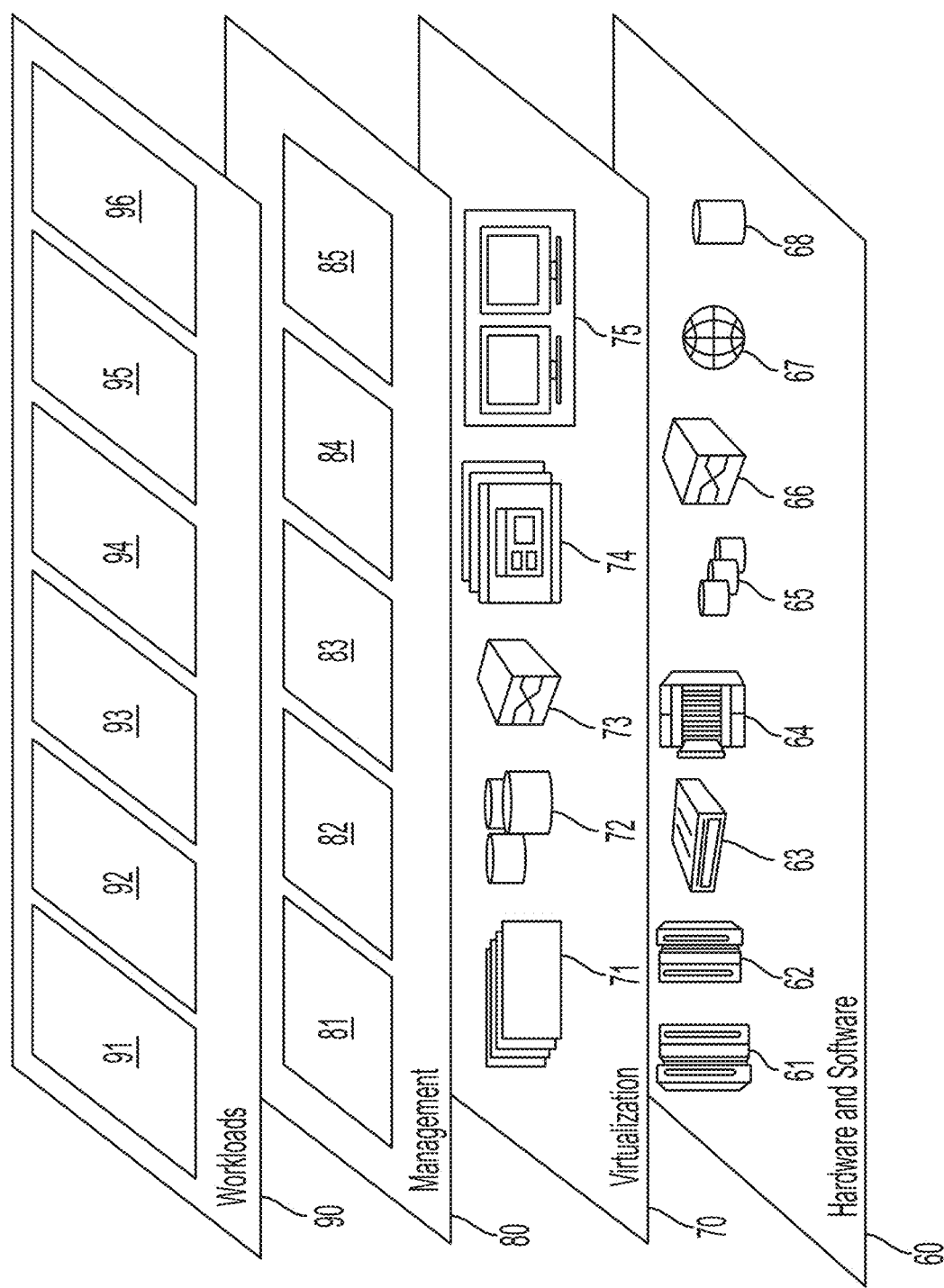
FIG. 4 depicts abstraction model layers according to one or more embodiments of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and breakpoint generation 96.

It is understood that one or more embodiments of the present invention are capable of being implemented in conjunction with any type of computing environment now known or later developed.

Figure 5:
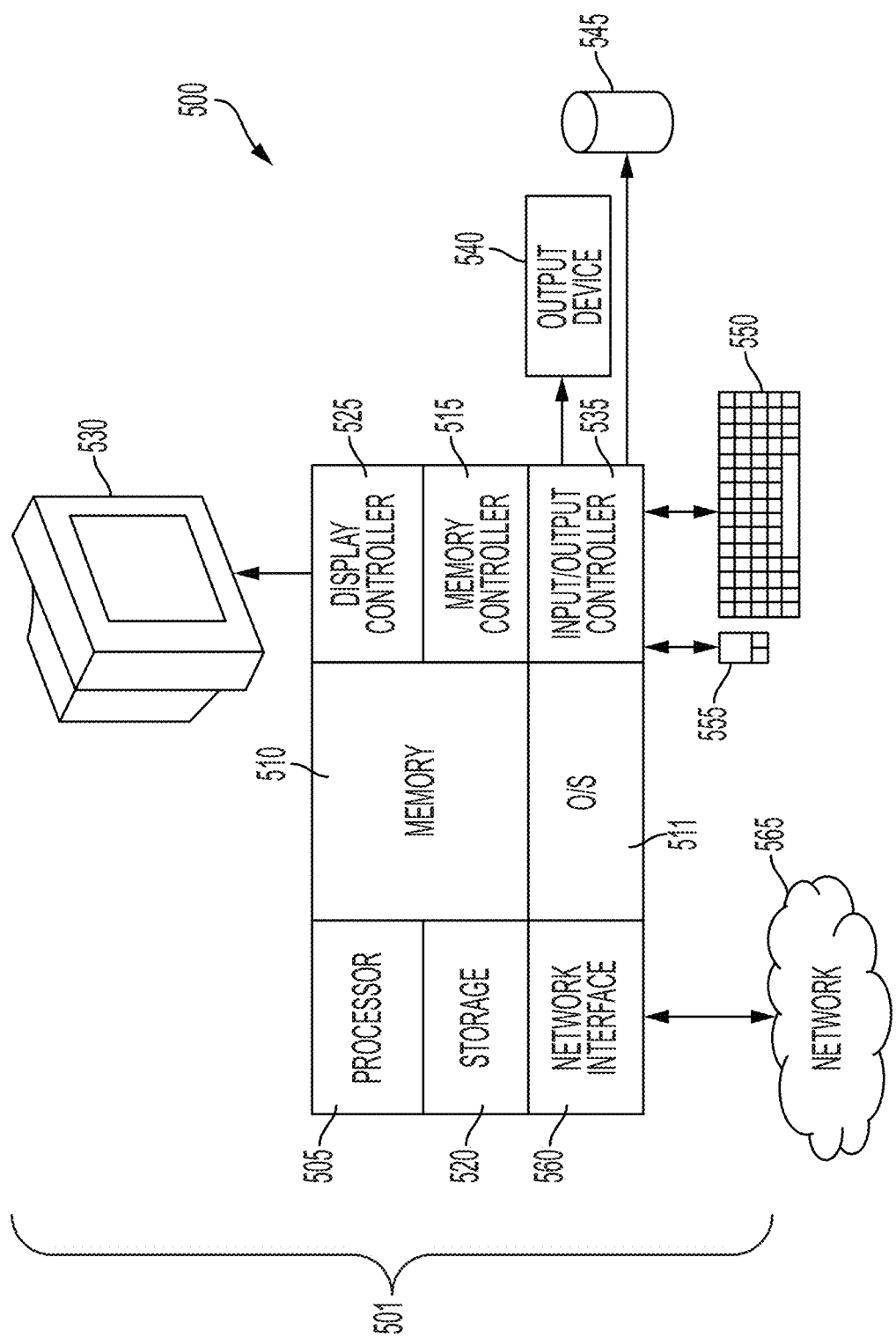
FIG. 5 illustrates a system for automatic integrity vulnerability detection in an IDE according to one or more embodiments of the present invention.

Turning now to FIG. 5, a computer system for automatic integrity vulnerability detection in an IDE is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 500 therefore may include general-purpose computer or mainframe 501 capable of running multiple instances of an O/S simultaneously. In accordance with one or more embodiments of the present invention, the general-purpose computer or mainframe 501 is implemented by a cloud computing node 10 as shown in FIG. 3.

In one or more exemplary embodiments of the present invention, in terms of hardware architecture, as shown in FIG. 5, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

In accordance with one or more embodiments of the present invention, the memory 510 may include multiple logical partitions (LPARs) each running an instance of an operating system. The LPARs may be managed by a hypervisor, which may be a program stored in memory 510 and executed by the processor 505.

In one or more exemplary embodiments of the present invention, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530.

In one or more exemplary embodiments of the present invention, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions. In accordance with one or more embodiments of the present invention, computer 501 is an example of a cloud computing node 10 of FIG. 3.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   receiving, by a processor, source code for a software program written in a first programming language;
   converting the received source code into abstracted source code, the abstracted source code in a generic format different than a format of the first programming language;
   comparing the abstracted source code to known vulnerability patterns;
   determining whether the abstracted source code matches a known vulnerability pattern in the vulnerability patterns by calculating a degree of confidence that the abstracted source code matches the known vulnerability patterns based at least in part on the degree of confidence meeting a threshold value; and
   based on determining that the abstracted source code matches the known vulnerability pattern in the known vulnerability patterns, alerting a user that the received source code matches the known vulnerability pattern, wherein the alerting includes providing the degree of confidence associated with the match and providing a proposed action to modify the source code to eliminate the match to the known vulnerability pattern.

2. The method of claim 1, wherein the receiving, converting, comparing, and alerting overlaps in time with the user editing the received source code in an integrated development environment (IDE).

3. The method of claim 2, wherein the alerting comprises highlighting a portion of the received source code that matches the known pattern on a user interface of the IDE.

4. The method of claim 3, wherein based on the alert comprising the proposed action, receiving an indication that the user agrees with the proposed action and performing the proposed action.

5. The method of claim 1, wherein the alerting comprises sending a report that comprises a portion of the received source code that matches the known pattern, and one or both of a degree of confidence associated with match and a proposed action to eliminate the match.

6. The method of claim 1, wherein the abstracted source code comprises JavaScript Object Notation (JSON) objects and the generic format is a JSON format.

7. The method of claim 1, wherein the known patterns are stored as JSON objects.

8. The method of claim 1, wherein the known patterns include an over reading pattern that indicates that the software program is reading from a location outside of a specified read location.

9. The method of claim 1, wherein the known patterns include an over writing pattern that indicates that the software program is writing to a location outside of a specified write location.

10. The method of claim 1, further comprising receiving source code written in a second programming language, and performing the converting, comparing, and alerting for the source code written in the second programming language.

11. A system comprising:
    one or more processors for executing computer readable instructions, the computer readable instructions controlling the one or more processors to perform operations comprising:
    receiving, by a processor, source code for a software program written in a first programming language;
    converting the received source code into abstracted source code, the abstracted source code in a generic format different than a format of the first programming language;
    comparing the abstracted source code to known vulnerability patterns;
    determining whether the abstracted source code matches a known vulnerability pattern in the vulnerability patterns by calculating a degree of confidence that the abstracted source code matches the known vulnerability patterns based at least in part on the degree of confidence meeting a threshold value; and
    based on determining that the abstracted source code matches the known vulnerability pattern in the known vulnerability patterns, alerting a user that the received source code matches the known vulnerability pattern, wherein the alerting includes providing the degree of confidence associated with the match and providing a proposed action to modify the source code to eliminate the match to the known vulnerability pattern.

12. The system of claim 11, wherein the receiving, converting, comparing, and alerting overlaps in time with the user editing the received source code in an integrated development environment (IDE).

13. The system of claim 12, wherein the alerting comprises highlighting a portion of the received source code that matches the known pattern on a user interface of the IDE.

14. The system of claim 13, wherein based on the alert comprising the proposed action, receiving an indication that the user agrees with the proposed action and performing the proposed action.

15. The system of claim 11, wherein the alerting comprises sending a report that comprises a portion of the received source code that matches the known pattern, and one or both of a degree of confidence associated with match and a proposed action to eliminate the match.

16. The system of claim 11, wherein the known patterns include one or both of an over reading pattern that indicates that the software program is reading from a location outside of a specified read location and an over writing pattern that indicates that the software program is writing to a location outside of a specified write location.

17. A computer program product comprising a non-transitory computer readable storage medium having program instructions embodied therewith, the program instructions executable by a processor to cause the processor to perform operations comprising:
    receiving, by a processor, source code for a software program written in a first programming language;

converting the received source code into abstracted source code, the abstracted source code in a generic format different than a format of the first programming language;

comparing the abstracted source code to known vulnerability patterns;

determining whether the abstracted source code matches a known vulnerability pattern in the vulnerability patterns by calculating a degree of confidence that the abstracted source code matches the known vulnerability patterns based at least in part on the degree of confidence meeting a threshold value; and based on determining that the abstracted source code matches the known vulnerability pattern in the known vulnerability patterns, alerting a user that the received source code matches the known vulnerability pattern, wherein the alerting includes providing the degree of confidence associated with the match and providing a proposed action to modify the source code to eliminate the match to the known vulnerability pattern.

\* \* \* \* \*